US008428163B2

(12) United States Patent
Kent et al.

(10) Patent No.: US 8,428,163 B2
(45) Date of Patent: *Apr. 23, 2013

(54) METHOD AND SYSTEM FOR DOPPLER SPREAD AND DELAY SPREAD MATCHING WITH CHANNEL ESTIMATION BY CIRCULAR CONVOLUTION IN OFDM COMMUNICATION NETWORKS

(75) Inventors: Mark Kent, Vista, CA (US); Uri Landau, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 371 days.

This patent is subject to a terminal disclaimer.

(21) Appl. No.: 12/646,869

(22) Filed: Dec. 23, 2009

(65) Prior Publication Data

US 2011/0026619 A1 Feb. 3, 2011

Related U.S. Application Data

(60) Provisional application No. 61/229,256, filed on Jul. 28, 2009.

(51) Int. Cl.
*H04K 1/10* (2006.01)
(52) U.S. Cl.
USPC .......................................... 375/260; 375/346
(58) Field of Classification Search .................. 375/260, 375/346, 148; 370/208, 329
See application file for complete search history.

(56) References Cited

U.S. PATENT DOCUMENTS

| 6,570,863 | B1 | 5/2003 | Kim et al. | |
|---|---|---|---|---|
| 7,970,068 | B2 | 6/2011 | Arambepola et al. | |
| 2007/0019748 | A1* | 1/2007 | Hoo et al. | 375/260 |
| 2007/0280366 | A1 | 12/2007 | Aytur et al. | |
| 2009/0059961 | A1 | 3/2009 | Shukla et al. | |
| 2009/0129493 | A1 | 5/2009 | Zhang et al. | |
| 2009/0161781 | A1* | 6/2009 | Kolze | 375/260 |
| 2009/0185630 | A1 | 7/2009 | Yang | |
| 2009/0323796 | A1 | 12/2009 | Futatsugi et al. | |
| 2010/0040159 | A1* | 2/2010 | Lee et al. | 375/260 |
| 2010/0067461 | A1* | 3/2010 | Kwak et al. | 370/329 |
| 2010/0158141 | A1 | 6/2010 | Hewavithana et al. | |
| 2010/0195700 | A1 | 8/2010 | Ogawa et al. | |
| 2011/0026618 | A1* | 2/2011 | Kent et al. | 375/260 |
| 2011/0026652 | A1* | 2/2011 | Kent et al. | 375/346 |
| 2011/0222393 | A1* | 9/2011 | Kwak et al. | 370/208 |

* cited by examiner

*Primary Examiner* — Emmanuel Bayard
(74) *Attorney, Agent, or Firm* — Sterne, Kessler, Goldstein & Fox P.L.L.C.

(57) ABSTRACT

A mobile device in an OFDM system receives an OFDM signal comprising RS tones and data OFDM symbols. The received RS tones are extracted and utilized to perform channel estimation. The resulting raw channel estimates are time filtered by matching channel time variance measured in frequency domain and in time domain, respectively. The measured channel time variance comprises inter-carrier interference measurement and Doppler spread measurement. Mean of differences between neighbor adjacent subcarriers of the extracted RS tones is used for inter-carrier interference measurement. Autocorrelation functions of the raw channel estimates are evaluated for the Doppler spread measurement using, for example, level crossing and/or axis crossing based methods. The raw channel estimates are filtered through averaging and/or recursively filtering using time filter parameters determined based on the inter-carrier interference measurement and the Doppler spread measurement. The time filtered channel estimates are utilized for data demodulation.

20 Claims, 5 Drawing Sheets

METHOD AND SYSTEM FOR DOPPLER SPREAD AND DELAY SPREAD MATCHING WITH CHANNEL ESTIMATION BY CIRCULAR CONVOLUTION IN OFDM COMMUNICATION NETWORKS

CROSS-REFERENCE TO RELATED APPLICATIONS/INCORPORATION BY REFERENCE

This application makes reference to, claims priority to, and claims the benefit of U.S. Provisional Patent Application Ser. No. 61/229,256 filed on Jul. 28, 2009

This application also makes reference to:

U.S. application Ser. No. 12/646,744 filed on Dec. 23, 2009; and

U.S. application Ser. No. 12/646,906 filed on even date herewith.

Each of the aforementioned referenced applications is hereby incorporated herein by reference in their entirety.

FIELD OF THE INVENTION

Certain embodiments of the invention relate to communication systems. More specifically, certain embodiments of the invention relate to a method and system for Doppler spread and delay spread matching with channel estimation by circular convolution in OFDM communication networks.

BACKGROUND OF THE INVENTION

Long Term Evolution (LTE) is a Third Generation Partnership Project (3GPP) standard that provides for an uplink speed of up to 50 megabits per second (Mbps) and a downlink speed of up to 100 Mbps. The LTE standard represents a major advance in cellular technology. The LTE standard is designed to meet current and future carrier needs for high-speed data and media transport as well as high-capacity voice support. The LTE standard brings many technical benefits to cellular networks, including Orthogonal Frequency Division Multiplexing (OFDM) and/or Multiple Input Multiple Output (MIMO) data communication. In addition, Orthogonal Frequency Division Multiple Access (OFDMA) and Single Carrier—Frequency Division Multiple Access (SC-FDMA) are used on the downlink (DL) and on the uplink (UL), respectively. In the LTE standard, bandwidth is scalable from 1.25 MHz to 20 MHz. This may suit the needs of different network operators that have different bandwidth allocations and also allow operators to provide different services based on spectrum availability. LTE is expected to improve spectral efficiency in 3G networks, allowing carriers to provide more data and voice services over a given bandwidth. LTE encompasses high-speed data, multimedia unicast and multimedia broadcast services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for Doppler spread and delay spread matching with channel estimation by circular convolution in OFDM communication networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for Doppler spread and delay spread matching with channel estimation by circular convolution in OFDM communication networks. In various embodiments of the invention, a mobile device in an OFDM communication system may be equipped with one or more RF receivers to receive OFDM signals from one or more transmit antennas, also named as ports or TX antennas. The received OFDM signals may comprise a plurality of reference signal (RS) tones and data OFDM symbols. The plurality of received RS tones may be extracted and utilized to perform channel estimation for each associated channel, namely a transmit—receive path. The resulting channel estimates may be time filtered as raw channel estimates to improve the quality of the channel estimates. Time filtering of the raw channel estimates may be performed by matching channel time variance measured in the frequency domain and in the time domain, respectively. The measured channel time variance may comprise inter-carrier interference measurement and Doppler spread measurement. The inter-carrier interference measurement may be performed in frequency domain by, for example, evaluating mean of differences between neighbor adjacent subcarriers of the extracted plurality of RS tones. The Doppler spread measurement may be estimated and/or calculated using autocorrelation functions of the raw channel estimates. Various methods such as, for example, level crossing and/or axis crossing, mean of time-loop tracking correction, and/or channel tap power time-variance, may be utilized for the Doppler spread measurement. Time filtering parameters may be determined based on the inter-carrier interference measurement and the Doppler spread measurement. The raw channel estimates may be time filtered, for example, through averaging the raw channel estimates across a plurality of OFDM symbols with proper weights and/or recursively time filtering the raw channel estimates using the determined time filter parameters. The resulting time filtered channel estimates at corresponding RS tones may be utilized for demodulating the received plurality of data OFDM symbols.

Figure 1A:
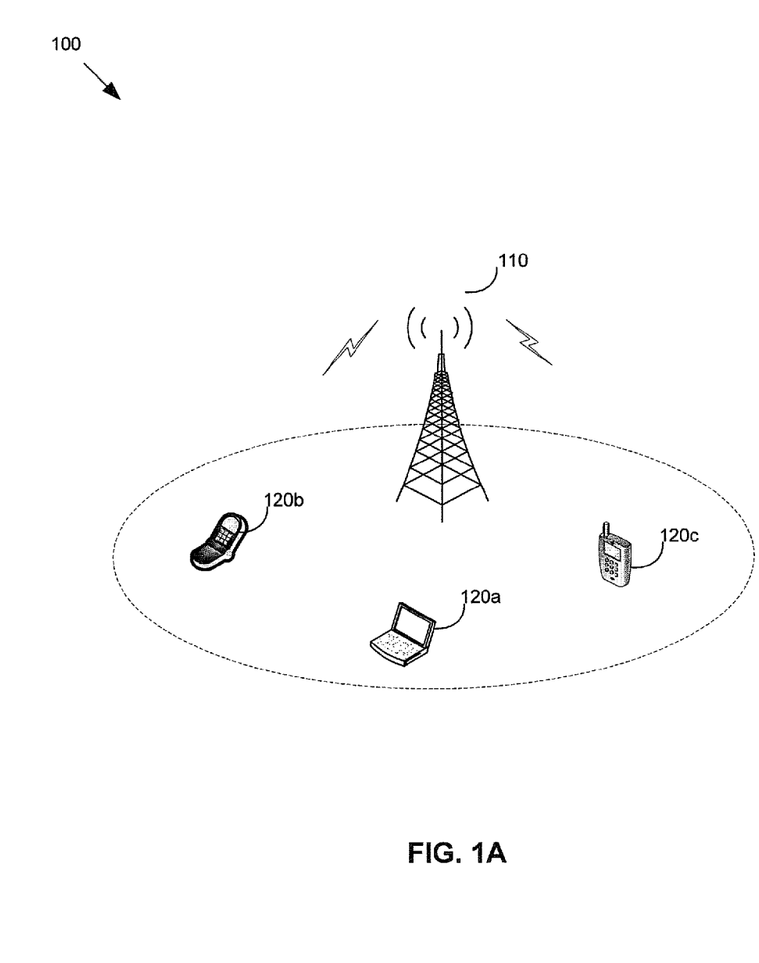
FIG. 1A is a diagram illustrating an exemplary cell in an OFDM based communication system that is operable to support channel estimation that matches Doppler spread and delay spread of a corresponding transmission channel, in accordance with an embodiment of the invention.

FIG. 1A is a diagram illustrating an exemplary cell in an OFDM based communication system that is operable to support channel estimation that matches Doppler spread and delay spread of a corresponding transmission channel, in accordance with an embodiment of the invention. Referring to FIG. 1A, there is shown an OFDM communication system 100. The OFDM communication system 100 comprises a base station 110, and a plurality of mobile devices, of which mobile devices 120a-120c are illustrated.

The base station 110 may comprise suitable logic, circuitry, interfaces and/or code that are operable to manage various aspects of communication, for example, communication connection establishment, connection maintenance and/or connection termination, over, for example, the LTE air interface. The base station 110 may be operable to manage associated radio resources such as, for example, radio bearer control, radio admission control, connection mobility control, and/or dynamic allocation of radio resources for associated mobile devices such as the mobile devices 120a-120c in both uplink and downlink communication. Physical channels and physical signals may be utilized for communication in both the uplink and the downlink communication. The physical channels such as P-SCH, S-SCH, BCH, PDCCH and PCFICH in the LTE standard may carry information from higher layers and may be used to carry user data as well as user control information. The physical signals such as a reference signal may not carry information from higher layers and may be used for cell search and/or channel estimation, for example.

The base station 110 may be operable to transmit reference signals to associated mobile devices such as the mobile devices 120a-120c in a predefined grid of tones (subcarriers). RS tones of a reference signal may be located or inserted in both the frequency direction and in the time direction, respectively. The RS tones may be embedded in the data of OFDM symbols to be transmitted. The pattern of the inserted reference OFDM symbols may be predetermined and known by both the transmitter and one or more corresponding receivers. For example, the RS tones may be inserted and transmitted at OFDM symbol 0 and 4 of each time slot depending on radio frame structure type and/or antenna port number. The base station 110 may be operable to index or count subcarriers used to transmit OFDM signals according to corresponding mappings in frequency spectrum. The transmitted OFDM signals may comprise RS tones and data OFDM symbols addressed to intended mobile devices such as, for example, the mobile devices 120a-120c. In the LTE standard, subcarriers may be located or spaced one tone per, for example, 15 KHz and 7.5 KHz. Subcarriers may be counted or indexed using either positive and/or negative integers at the zero crossing point of a DC subcarrier. The base station 110 may be operable to provide a vacant DC subcarrier (means no signal transmission over the DC subcarrier) to allow simplified receiver architecture such as, for example, a direct conversion receiver implementation. The vacancy of the DC subcarrier may block un-proportionally high interferences, for example, due to on-chip and/or local oscillator leakage. However, the vacancy of the DC subcarrier may result in the irregularities in the spacing of the RS tones and may cause distortions to channel estimation at the intended mobile devices such as, for example, the mobile devices 120a-120c.

A mobile device such as the mobile device 120a may comprise suitable logic, circuitry, interfaces and/or code that may be operable to communicate with a base station such as the base station 110 for services supported, for example, in the LTE standard. The mobile device 120a may be operable to initiate, maintain, and/or terminate communications with the base station 110 by performing various procedures such as, for example, cell search and/or channel quality reporting. The mobile device 120a may be operable to demodulate data OFDM symbols received from the base station 110 to identify transmitted bit streams over corresponding subcarriers.

The mobile device 120a may be operable to estimate channel conditions to determine changes in subcarrier on received OFDM signals. A change in subcarrier on the received OFDM signals may be a result of channel propagations. In order to account for time varying and frequency selective fading channels, the mobile device 120a may be operable to perform channel estimation using RS tones embedded in the received OFDM signals. Time and/or frequency tracking may be achieved using the embedded RS tones in the channel estimation. The ability of the mobile device 120a to receive data may be bound by, for example, the quality of the channel estimation. Inaccurate channel estimation may limit capability of the mobile device 120a to remove channel effects and consequently impair the throughput of the mobile device 120a.

The mobile device 120a may be operable to perform channel estimation by applying a masking operation over channel taps (time domain) of the received RS tones. Desired channel taps may be reserved by being weighted with non-zero mask values. Undesired channel taps and/or channel tap replicas may be removed by being weighted using a zero mask value. Non-zero mask values may be stored and applied during channel estimation in order to achieve low complexity channel estimation. The low complexity channel estimation may provide a way for further simplification to achieve optimal channel estimation for wide class of channels in dynamic conditions. Due to counting out the DC subcarrier in the LTE standard, pointers of subcarriers (tones) of the received RS tones may be shifted prior to channel estimation to overcome performance limitations that may exist due to irregular spacing between the RS tones.

The channel estimation may be performed in each OFDM symbol. The resulting channel estimates in each OFDM symbol may be referred to as raw channel estimates. In this regard, the mobile device 120a may be operable to perform time filtering of the raw channel estimates to further improve the quality of the channel estimates. The raw channel estimates may be time filtered for each channel tap individually. The mobile device 120a may be operable to utilize various methods to time filter the raw channel estimates. In various exemplary embodiments of the invention, time filtering may be achieved by one or more method comprising averaging the raw channel estimates across multiple OFDM symbols with proper weights and/or recursively time filtering the raw channel estimates. In this regard, inter-carrier interference (ICI) and Doppler spread may be measured in frequency domain and time domain, respectively. The inter-carrier interference measurement and Doppler spread measurement may be utilized to determine time filter parameters, for example, the time-filtering coefficients and/or length. Accordingly, time filtering of the raw channel estimates may be realized so as to match Doppler spread and delay spread of corresponding transmission channels.

Although time-filtering raw channel estimates by matching Doppler spread and delay spread is illustrated for the channel estimation in downlink, the invention may not be so limited.

Accordingly, time-filtering channel estimates by matching Doppler spread and delay spread may be applied to any RS-tone based channel estimation without departing from the spirit and scope of various embodiments of the invention.

In an exemplary operation, the base station 110 may be operable to transmit OFDM signals over LTE air interface to an intended mobile device such as the mobile devices 120a. Subcarriers used to transmit OFDM signals to the mobile device 120a may be counted or indexed in either positive or negative integers at the zero crossing point of the DC subcarrier. The DC subcarrier may be vacant and may not be used for transmission. RS tones may be embedded in the OFDM signals for time and frequency tracking at the mobile device 120a. The RS tones may be inserted and transmitted in a predefined grid of RS tones (subcarriers). In the LTE standard, the RS tones may be irregularly spread or irregularly spaced due to the DC subcarrier counting out. At reception, the mobile device 120a may be operable to utilize the received RS tones for channel estimation in order to demodulate received OFDM signals.

In order to reduce distortions created due to irregular spacing between the received RS tones, the mobile device 120a may be operable to shift pointers of the received RS tones (subcarriers) such that the resulting pointer shifted RS tones may be evenly or regularly spaced in subcarrier. The pointer shifted RS tones may be utilized for channel estimation. In this regard, in each OFDM symbol, a masking operation may be performed in time domain over channels taps of the pointer shifted RS tones to remove undesired channel taps. The masking operation may comprise an element-wise product between the channels taps of the pointer shifted RS tones and a predetermined mask. The masking operation may provide low complexity in term of computation and memory requirements in channel estimation. The undesired channel taps may be weighted with zero mask values, while desired channel taps may be weighted using non-zero mask values. The resulting masked channel taps may provide raw channel estimates for the channel estimation to improve the quality of the channel estimates.

Time filtering of the raw channel estimates may be performed for each channel tap, individually. Channel time variance such as Inter-carrier interference and/or Doppler spread may be measured in frequency domain and time domain, respectively. Time filter parameters such as time filter coefficients and/or time filter length may be determined based on the inter-carrier interference measurement and Doppler spread measurement. Time filtering of the raw channel estimates may be realized to match Doppler spread and delay spread of corresponding transmission channels. The time filtered channel estimates may be converted to corresponding frequency samples and back shifted in subcarrier for frequency domain channel equalization.

Figure 1B:
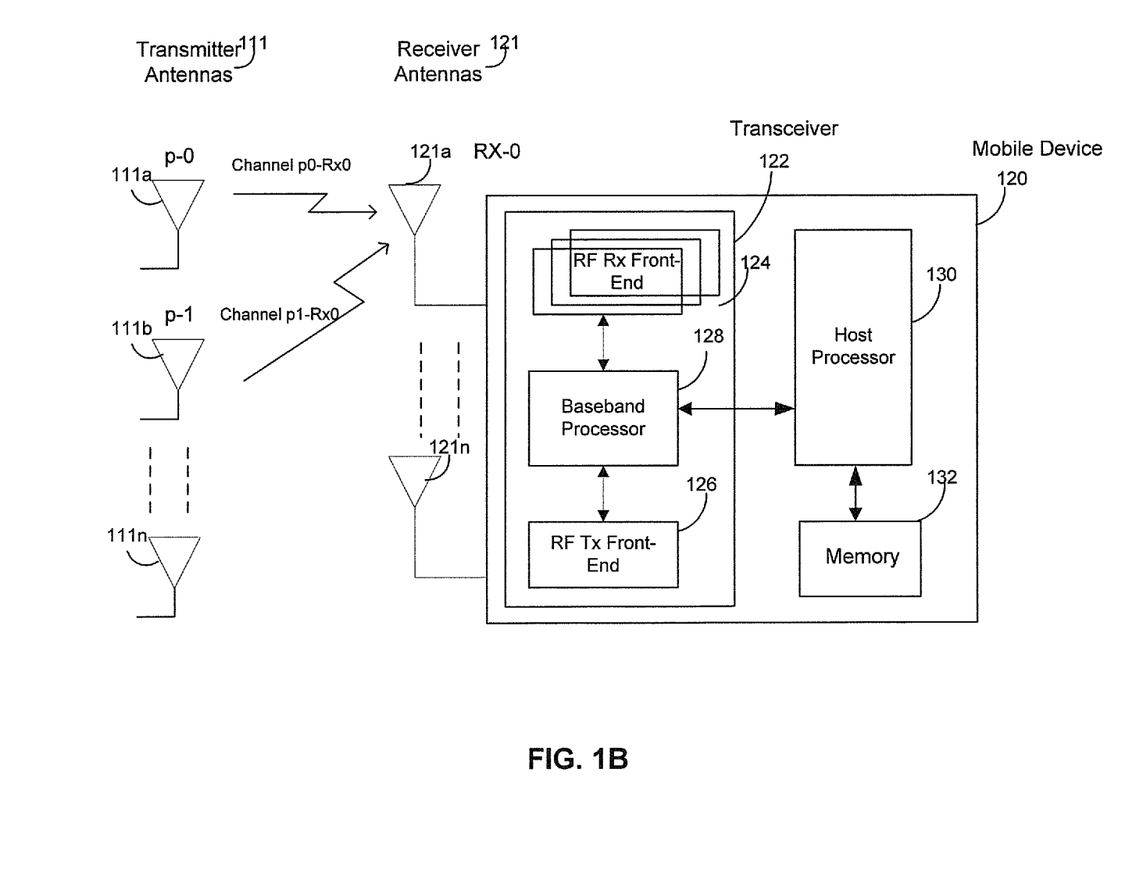
FIG. 1B is a block diagram of an exemplary communication device that may be operable to perform channel estimation that matches Doppler spread and delay spread of a corresponding transmission channel in an OFDM system, in accordance with an embodiment of the invention.

FIG. 1B is a block diagram of an exemplary communication device that may be operable to perform channel estimation that matches Doppler spread and delay spread of a corresponding transmission channel in an OFDM system, in accordance with an embodiment of the invention. Referring to FIG. 1B, there is shown a mobile device 120 comprising multiple antennas 121a-121n, a transceiver 122, a host processor 130 and a memory 132. The transceiver 122 comprises multiple radio frequency (RF) receiver (Rx) front-ends 124, a RF transmitter (Tx) front-end 126 and a baseband processor 128.

The multiple antennas 121a-121n, also named: ports or RX antennas, may comprise suitable logic, circuitry, interfaces and/or code that may be suitable for transmitting and/or receiving electromagnetic signals. In this regard, the multiple antennas 121a-121n may be operable to receive signals from corresponding multiple transmit antennas 111 (also named: ports or TX antennas). Each transmit—receive path is called a channel. For example, the FIG. 1B shows a channel between a transmit antenna 111a and a receive antenna 121a. The transceiver 122 may comprise suitable logic, circuitry, interfaces and/or code that may be operable to transmit and/or receive RF signals adhering to one or more wireless standards such as the LTE standard. The transceiver 122 may comprise multiple RF Rx front-ends 124. Each associated RF Rx front-end is used to process signals over a specific channel such as the channel between a transmit antenna 111a and a receive antenna 121a shown in FIG. 1B.

The multiple RF Rx front-ends 124 may comprise suitable logic, circuitry, interfaces and/or code that may be operable to process RF signals received, for example, over the LTE air interface, via specific antenna-pair such as the transmit antenna (port-0) at the receive antenna 121a (Rx-0). The multiple RF Rx front-ends 124 may be operable to convert the received RF signals to corresponding baseband signals and perform analog-to-digital conversion of the baseband signals. The resulting digital baseband signals may be processed via, for example, pulse shaping and communicated with the baseband processor 128 for further baseband processing.

The RF Tx front-end 126 may comprise suitable logic, circuitry, interfaces and/or code that may be operable to process RF signals for transmission. The RF Tx front-end 126 may be operable to receive digital baseband signals from the baseband processor 128 and perform digital-to-analog conversion of the received digital baseband signals. The RF Tx front-end 126 may be operable to convert the resulting analog baseband signals to corresponding RF signals for transmission via the antenna 121.

The baseband processor 128 may comprise suitable logic, circuitry, interfaces and/or code that may be operable to manage and/or control operations of the RF Rx front-ends 124 and the RF Tx front-end 126, respectively. The baseband processor 128 may be operable to communicate baseband signals with the transceiver 122. The baseband processor 128 may be operable to handle baseband signals to be transferred to the RF Tx front-end 126 for transmission and/or process baseband signals from the RF Rx front-ends 124. The received baseband signals may comprise OFDM signals received from, for example, the LTE base station 110. The received OFDM signals may comprise a plurality of RS tones and a plurality of data OFDM symbols. In this regard, the baseband processor 128 may be operable to perform various baseband procedures such as, for example, channel estimation and/or channel equalization to demodulate the received data OFDM symbols. The RS tones may be utilized in the channel estimation. In this regard, the baseband processor 128 may be operable to estimate channels at corresponds RS tones by performing a masking operation over channel taps (time domain) of the received RS tones. The RS tones may be irregularly spaced in the subcarrier due to, for example, counting out the DC subcarrier as presented in the LTE standard. Accordingly, pointers in the subcarrier of the RS tones may be shifted prior to channel estimation to overcome performance limitations that may exist due to irregular spacing between the RS tones.

Resulting masked channel estimates may provide raw channel estimates for the channel estimation at corresponding RS tones. The raw channel estimates may be time filtered to suppress the noise variance in the raw channel estimates through noise averaging. The baseband processor 128 may be operable to measure channel time variance such as inter-carrier interference and Doppler spread in frequency domain and time domain, respectively. The inter-carrier interference measurement and Doppler spread measurement may be utilized to determine time filter parameters such as time filter coefficients and length such that time filtering of the raw channel estimates may be performed by matching Doppler spread and delay spread of the transmission channel.

The host processor 130 may comprise suitable logic, circuitry, interfaces and/or code that may be operable to manipulate and control operation of the transceiver 122. The host processor 130 may be operable to communicate data with the transceiver 122 to support applications such as, for example, audio streaming on the mobile device 120.

The memory 132 may comprise suitable logic, circuitry, and/or code that may enable storage of information such as executable instructions and data that may be utilized by the host processor 130 as well as the baseband processor 128. The executable instructions may comprise algorithms that may be applied to various baseband signal processes such as channel estimation. The memory 132 may comprise RAM, ROM, low latency nonvolatile memory such as flash memory and/or other suitable electronic data storage.

In an exemplary operation, the multiple RF Rx front-ends 124 may be operable to process RF signals received, for example, over the LTE air interface, via various antenna-pair such as the transmit antenna 111a (port-0) at the receive antenna 121a (Rx-0). The received RF signals may comprise data for an intended application. The received RF signals may be converted to corresponding baseband signals and for further baseband processing. RS tones in the baseband signals may be used by the baseband processor 128 to estimate channels at corresponding RS tones in order to demodulate the received OFDM signals to recover the data OFDM symbols in the baseband signals. The demodulated data OFDM symbols may be communicated with the host processor 130 for the intended application such as a video conference call on the mobile device 120.

In instances where the RS tones may be irregularly spaced in a subcarrier due to, for example, counting out the DC subcarrier as presented in the LTE standard, pointers in subcarrier of the RS tones may be shifted prior to channel estimation to overcome distortions caused by the irregular spacing between the RS tones.

The baseband processor 128 may be operable to perform the channel estimation in each OFDM symbol. The baseband processor 128 may be operable to estimate the channel using various methods such as, for example, by masking channel taps (time domain) of the received corresponding RS tones. The resulting raw channel estimates at the corresponding RS tones may be time filtered to improve the quality of the channel estimates. In this regard, the baseband processor 128 may be operable to measure inter-carrier interference and Doppler spread in frequency domain and time domain, respectively. Time filtering parameters such as time filter coefficients and length may be determined using the inter-carrier interference measurement and Doppler spread measurement such that time filtering of the raw channel estimates may be realized by matching Doppler spread and delay spread of the transmission channel.

Figure 2:
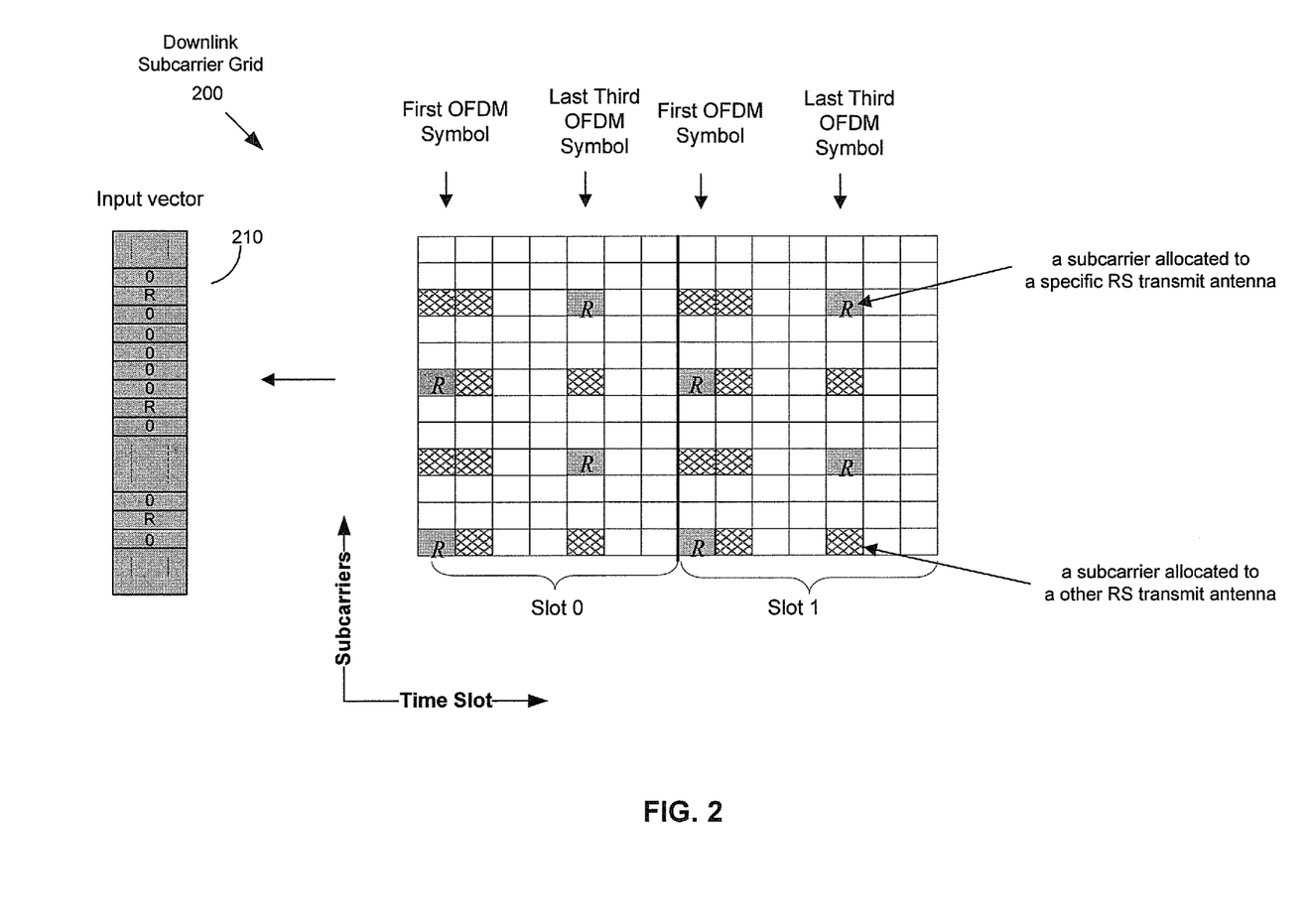
FIG. 2 is a block diagram illustrating an exemplary downlink subcarrier grid that shows occupations of embedded OFDM reference signals, in accordance with an embodiment of the invention.

FIG. 2 is a block diagram illustrating an exemplary downlink subcarrier grid that shows occupations of embedded reference OFDM signals, in accordance with an embodiment of the invention. Referring to FIG. 2, there is shown a downlink subcarrier grid 200. The downlink subcarrier grid 200 comprises a plurality of RS tones that may be located or inserted in a predetermined grid of tones (subcarriers). For example, in the LTE standard, the plurality of RS tones may be placed and transmitted in, for example, the first OFDM symbol of one slot and/or on the third last OFDM symbol.

Processing a specific antenna-pair, say the transmit antenna 111a (port-0) at the receive antenna 121a (Rx-0), may be started by processing the signals that are received through the receive antenna 121a (Rx-0). After extracting a set of RS tones from the received signals, an input vector 210 of length Ns is created, where parameter Ns represents number of subcarriers. The input vector 210 may represent channel impulse responses at the RS frequencies and zeros elsewhere. The extracted set of RS tones within input vector 210 are associated with a set of location indices (or pointers or addresses) within the input vector 210. The set of pointers may also represent the RS frequencies.

In some cases a gap or irregularity in the spacing of the extracted RS tones may occur. For example, in the LTE standard the used-tones may range from 0 to N−1 tones (a subset of 0:Ns−1 tones, N is a positive integer and N<Ns); with N/2 tones below DC (DC is the zero frequency) and N/2 tones above DC. L frequencies of the extracted RS tones are mapped to the used-tone range of 0:N−1 by omitting the DC tone from the used-tone range. This RS mapping has a step of, for example, 6-tones counting over the range of 0:N−1, but it has a jump of one tone when counting the physical tones. For example, the extracted RS tones located at subcarriers [ . . . , −6, 0, 7, . . . ] may be mapped or shifted to subcarriers [ . . . , −6, 0, 6, . . . ] to achieve regularly spaced RS tones in subcarrier. With the RS mapping, the gap or irregularity in the spacing of the extracted RS tones may be corrected and minimize the distortion created in filtration and/or smoothing taking place in channel estimation process. In this regard, an IFFT operation may be applied on the pointer shifted plurality of channel RS tones for the channel impulse response.

Figure 3:
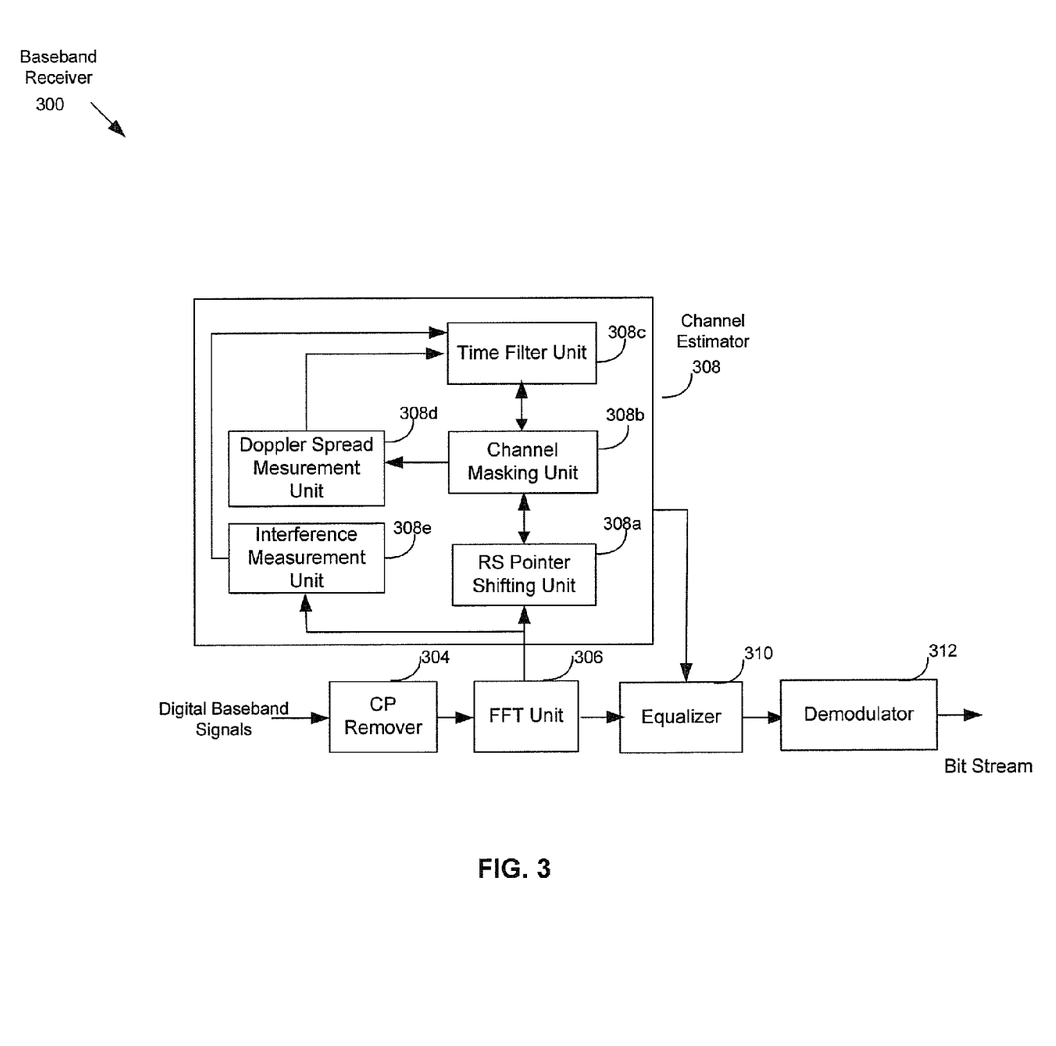
FIG. 3 is a block diagram illustrating an exemplary baseband receiver that is operable to perform channel estimation that matches Doppler spread and delay spread of a corresponding transmission channel in an OFDM system, in accordance with an embodiment of the invention.

FIG. 3 is a block diagram illustrating an exemplary baseband receiver that is operable to perform channel estimation that matches Doppler spread and delay spread of a corresponding transmission channel in an OFDM system, in accordance with an embodiment of the invention. Referring to FIG. 3, there is shown a baseband receiver 300. The baseband receiver 300 comprises a cyclic prefix (CP) remover 304, a FFT unit 306, a channel estimator 308, an equalizer 310 and a demodulator 312. The channel estimator 310 comprises a reference signal (RS) pointer shifting unit 310a, a channel masking unit 310b, a time filter unit 308c, a Doppler spread measurement unit 308d and an interference measurement unit 308e.

The CP remover 304 may comprise suitable logic, circuitry, interfaces and/or code that may be operable to remove cyclic prefix (CP) components from digital baseband signals, which corresponds to RF signals received via a specific antenna such as the antenna 121a. The CP components comprise copies of desired signal tail. The CP components may be inserted at the beginning of each OFDM symbol at transmitter to absorb or remove multipath interferences. The duration of the CP components in each OFDM symbol may be chosen so that it is larger than the expected channel delay spread to eliminate multipath interference.

The FFT unit 306 may comprise suitable logic, circuitry, interfaces and/or code that may be operable to perform fast Fourier transform (FFT) over OFDM symbols from the CP remover 304. The FFT unit 306 may be operable to convert time domain samples of the OFDM symbols to corresponding frequency domain samples for frequency domain channel equalization.

The channel estimator 308 may comprise suitable logic, circuitry, interfaces and/or code that may be operable to estimate channel conditions such as, for example, Signal-to- Interference and Noise Ratio (SINR), attenuation of high subcarriers, and/or phase shift using received RS tones. Frequency domain samples of the received RS tones may be extracted from the output of the FFT unit 306 and may be used for channel estimation. Estimated channel conditions may be communicated with the equalizer 310 for channel equalization to remove, for example, inter-symbol interferences within the received OFDM symbols. With regard to the LTE standard, the received RS tones may be irregularly spaced in subcarrier due to the DC subcarrier counting out. In order to compensate distortions to channel estimation due to the irregular RS tone spacing, pointers of the received RS tones may be relocated via the RS pointer shifting unit 308a prior to channel estimation.

The RS pointer shifting unit 308a may comprise suitable logic, circuitry, interfaces and/or code that may be operable to shift pointers of RS tones in subcarrier. In this regard, the RS pointer shifting unit 308a may be operable to shift irregularly spaced RS tones to regularly spaced RS tones in subcarrier to overcome distortions to channel estimation. The regularly spaced RS tones may be converted to time domain samples (channel taps) and used for channel estimation by the channel masking unit 308b. The RS pointer shifting unit 308a may be operable to back shift or reverse shift the pointer shifted RS tones to, for example, the original locations of the received RS tones for frequency domain channel equalization via the equalizer 310.

The channel masking unit 308b may comprise suitable logic, circuitry, interfaces and/or code that may be operable to perform channel estimation in time domain using channel tap masking operation. The channel tap masking operation may be performed per OFDM symbol by applying a mask over channel taps of the pointer shifted RS tones from the RS pointer shifting unit 308a. In this regard, the channel masking unit 308b may be operable to first convert the pointer shifted RS tones into time domain samples (channel taps) using an IFFT operation. The pointer shifted RS tones may be windowed or truncated to take a portion of the pointer shifted RS tones for the IFFT operation. The size of the window, which may is utilized for the widowing or truncation, may be determined based on, for example, channel conditions. The channel taps of the pointer shifted RS tones may comprise desired channel taps, undesired channel taps, and/or channel tap replicas. The channel taps may be processed via an element-wise product. For example, the desired channel taps may be weighted using non-zero mask values. The undesired channel taps and/or the channel tap replicas may be weighted using a zero mask value.

The channel masking unit 308b may be operable to perform channel tap masking operation on the pointer shifted RS tones in each OFDM symbol. The resulting masked channel taps may be communicated to the time filter unit 308 as raw channel estimates to further improve the quality of the channel estimates at corresponding RS tones. The time filtered channel estimates may be converted back to corresponding frequency domain samples using a FFT operation for frequency domain channel equalization via the equalizer 310. In this regard, the corresponding frequency domain samples may be back-shifted prior to channel equalization.

The time filter unit 308c may comprise suitable logic, circuitry, interfaces and/or code that may be operable to perform time filtering of raw channel estimates to improve quality of channel estimates. The time filter unit 308c may be operable to suppress the noise variance in the raw channel estimates using various methods, for example, through noise averaging. The time filter unit 308c may be operable to effectively reduce channel aliasing and/or linear time variation across channel taps of the raw channel estimates. Time filtering of the raw channel estimates at the corresponding RS tones may be individually performed for each of the channel taps. The time filter unit 308c may be operable to time filter the raw channel estimates by averaging across multiple OFDM symbols with proper weights or recursively filtering. Time filter parameters such as, for example, time filter coefficients and time filter length, may be selected and/or determined based on transmission channel conditions in both frequency domain and time domain. In this regard, the time filter unit 308c may be operable to determine time filter parameters based on channel time variance such as inter-carrier interference and Doppler spread, which may be measured in frequency domain and in time domain, respectively. The time filter unit 308c may be operable to time filter the raw channel estimates to match the Doppler spread and the delay spread of the corresponding transmission channels using the determined time filter parameters. The time filtered channel estimates may be converted to corresponding frequency samples and back shifted in subcarrier for frequency domain channel equalization.

The Doppler spread measurement unit 308d may comprise suitable logic, circuitry, interfaces and/or code that may be operable to measure the Doppler spread of the transmit channels in time domain. The Doppler spread measurement unit 308d may be operable to utilize autocorrelation functions of corresponding channel impulse response to estimate and/or calculate Doppler spread of transmission channels. Various methods comprising, for example, level crossing and/or axis crossing, mean of time-loop tracking correction, and/or channel tap power time-variance, may be utilized to estimate the Doppler spread. The estimated Doppler spread may be communicated with the time filter unit 308c to be used to select time filter parameters.

The interference measurement unit 308e may comprise suitable logic, circuitry, interfaces and/or code that may be operable to measure interference such as inter-carrier interference (phase noise) of transmission channels. The interference measurement unit 308e may be operable to perform inter-carrier interference measurement in the frequency domain. Various methods such as, for example, using mean of differences between sounding (neighbor) noisy adjacent subcarriers, may be utilized to estimate and/or calculate the inter-carrier interference measurement. The inter-carrier interference measurement may be communicated with the time filter unit 308c to be used to select time filter parameters.

The equalizer 310 may comprise suitable logic, circuitry, interfaces and/or code that may be operable to perform interference suppression and/or compensation in frequency domain to remove inter-symbol interferences (ISI) from OFDM symbols of received signals. The equalizer 310 may be operable to mitigate the effects of ISI and not enhance the noise power in the received signal.

The demodulator 312 may comprise suitable logic, circuitry, interfaces and/or code that may be operable to demodulate received data streams to restore corresponding transmitted data.

In an exemplary operation, received OFDM baseband signals may be communicated with the CP remover 304. The CP remover 304 may be operable to remove CP components from the received OFDM baseband signals and communicate with the FFT unit 306. The FFT unit 306 may be operable to convert time domain samples associated with OFDM symbols of the received OFDM baseband signals to corresponding frequency domain samples for frequency domain channel equalization. The channel estimator 308 may be operable to extract RS tones from the resulting frequency domain samples at the output of the FFT unit 306. Pointers in subcarrier of the extracted RS tones may be shifted via the RS pointer shifting unit 308a to compensate distortions to channel estimation due to irregularly spaced RS tones. The pointer shifted RS tones may be used for channel estimation. In this regard, in each OFDM symbol, channels taps of the pointer shifted RS tones may be masked in time domain via the channel masking unit 308b.

The resulting masked channel taps may be communicated to the time filter unit 308 as raw channel estimates for time filtering to improve the quality of the channel estimates at corresponding RS tones. The time filter unit 308 may be operable to determine time filter parameters such as time filter coefficients and time filter length based on channel variance measurement in both time domain and frequency domain. The channel variance measurement may comprise, for example, the Doppler spread measurement from the Doppler spread measurement unit 308d and the inter-carrier interference measurement from the interference measurement unit, respectively. The time filter unit 308 may be operable to time filter the raw channel estimates so as to match the Doppler spread and the delay spread of corresponding transmission channel. The resulting time filtered channel estimates at corresponding RS tones may be converted corresponding frequency domain samples to provide estimated channel conditions for frequency domain channel equalization. In this regard, the corresponding frequency domain samples of the time filtered channel estimates may be back shifted in subcarrier prior to channel equalization. The equalizer 310 may be operable to remove inter-symbol interferences (ISI) from the received OFDM symbols using the estimated channel conditions. The RS tones may be removed prior to data OFDM symbol demodulation. The data OFDM symbols may be demodulated via the demodulator 312, accordingly.

Figure 4:
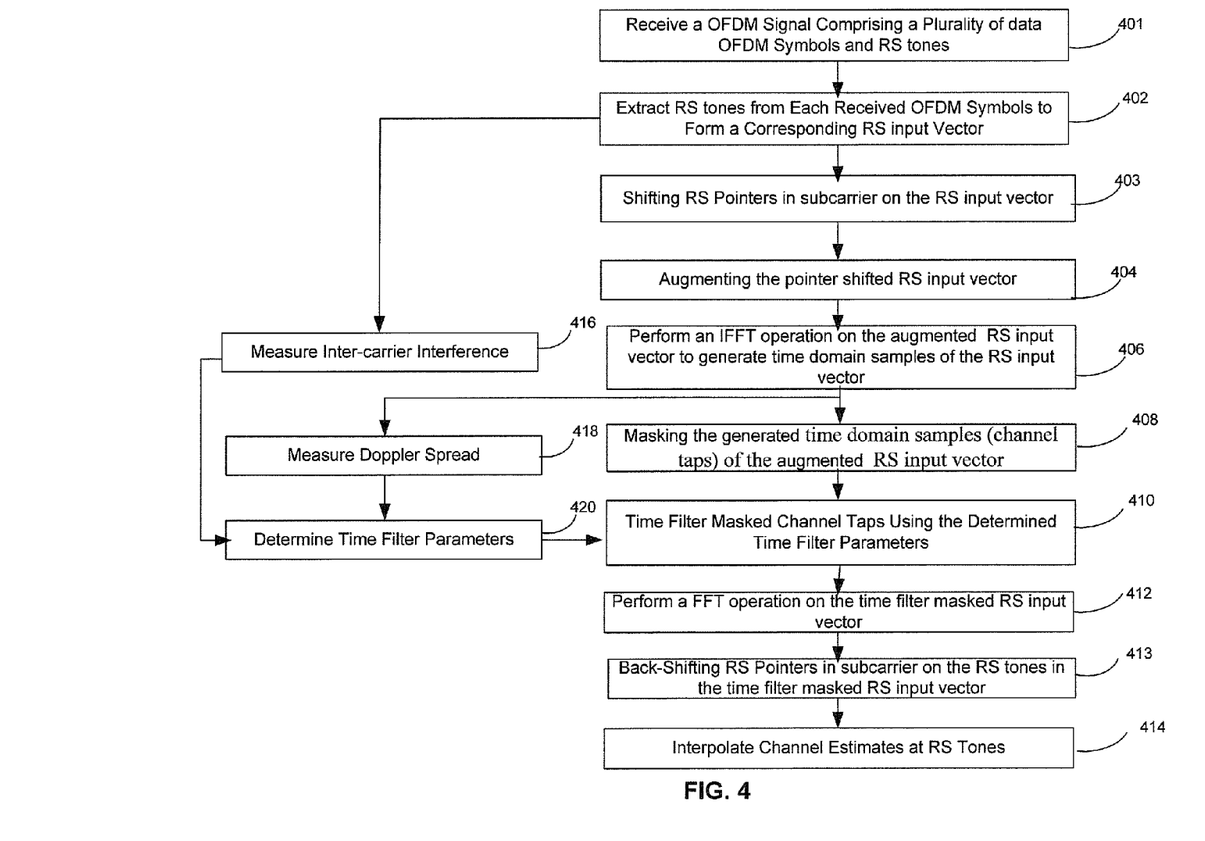
FIG. 4 is a flow chart illustrating an exemplary channel estimation procedure that matches Doppler spread and delay spread of a corresponding transmission channel, in accordance with an embodiment of the invention.

FIG. 4 is a flow chart illustrating an exemplary channel estimation procedure that matches Doppler spread and delay spread of a corresponding transmission channel, in accordance with an embodiment of the invention. Referring to FIG. 4, the exemplary steps may start with the step 401. In step 401, the baseband receiver 300 may be operable to receive an OFDM signal comprising a plurality of data OFDM symbols and RS tones. In step 402, The RS tones embedded in each received data OFDM symbol in the received OFDM signal may be extracted from frequency samples at the output of the FFT unit 306 to form a RS input vector to the channel estimator 308. In step 403, pointers of the extracted RS tones may be shifted in subcarrier for regularly spaced RS tones. In step 404, the resulting pointer shifted RS input vector is augmented on both sides of the pointer shifted RS input vector so as to reduce edge effects in a subsequent IFFT operation. For example, the pointer shifted RS input vector may be augmented via, for example, by repeating the last several left RS tone and the last several right RS tones, respectively. Other augmentation techniques may utilize extrapolation, windowing, etc. In step 406, the RS tones in the augmented RS input vector may be converted into corresponding time domain samples via using IFFT operation. In step 408, the time domain samples (channel taps) of the corresponding RS tones in the augmented RS input vector may be masked. In this regard, desired channel taps may be weighted with non-zero mask values. Undesired channel taps and/or channel tap replicas may be weighted with zero mask values.

The resulting masked channel estimates may provide raw channel estimates for the channel estimation at corresponding RS tones. In step 410, the time filter unit 308c may be operable to time filter the raw channel estimates from the channel masking unit 308b using determined time filter parameters. In step 412, the time filtered channel estimates may be converted via FFT operation into corresponding frequency domain samples for channel equalization. In step 413, pointers of the corresponding frequency domain samples may be back-shifted in subcarrier and provided to the equalizer 310 for frequency domain channel equalization to remove ISI interferences. In step 414, channel estimates at RS tones may be interpolated for data OFDM symbols when need.

In step 416, inter-carrier interference may be measured via the interference measurement unit 308e. The inter-carrier interference measurement may be performed in frequency domain over the extracted reference OFDM symbols in step 402. Various interference estimation methods such as Kalman filtering may be utilized for the inter-carrier interference measurement. The resulting inter-carrier interference measurement may be communicated to the time filter unit 308c. In step 418, the Doppler spread may be measured via the Doppler spread measurement unit 308d. The Doppler spread measurement may be performed in time domain via various Doppler spread estimation methods such as, for example, using autocorrelation functions of the raw channel estimates from the channel masking unit 306 and/or performing an eigen-based Doppler frequency estimation method over the raw channel estimates from the channel masking unit 306. The resulting Doppler spread measurement may be communicated to the time filter unit 308c. In step 420, the time filter unit 308c may be operable to determine time filter parameters such as time filter coefficients and time filter length using channel time variance measurement in both frequency domain and time domain, respectively. The channel variance measurement may comprise the inter-carrier interference measurement provided by the interference measurement unit 308e and the Doppler spread measurement provided by the Doppler spread measurement unit 308d, respectively. The determined time filter parameters may be utilized for time filtering of the raw channel estimates in step 410.

In various exemplary aspects of the method and system for Doppler spread and delay spread matching with channel estimation by circular convolution in OFDM communication networks, a mobile device such as the mobile device 120a in the OFDM communication system 100 may be operable to receive an OFDM signal from, for example, the base station 110. The received OFDM signal may comprise a plurality of RS tones and data OFDM symbols. The plurality of received RS tones may be extracted and utilized to perform channel estimation in each OFDM symbol. The resulting channel estimates may be communicated as raw channel estimates with the time filter unit 308c. The time filter unit 308c may be operable to time filter the raw channel estimates to improve the quality of the channel estimates. The time filter unit 308c may be operable to perform time filtering of the raw channel estimates by matching channel time variance measured in both frequency domain and in time domain. The channel time variance may comprise inter-carrier interference and Doppler spread which are measured in the frequency domain via the interference measurement unit 308e and in the time domain via the Doppler spread measurement unit 308d, respectively.

The interference measurement unit 308e may be operable to perform inter-carrier interference measurement in the frequency domain, for example, by evaluating mean of differences between neighbor adjacent subcarriers of the extracted plurality of reference OFDM symbols. The Doppler spread measurement unit 308d may be operable to utilize autocorrelation functions of the raw channel estimates to estimate and/or calculate Doppler spread of transmission channels at corresponding RS tones. Various methods comprising, for example, level crossing and/or axis crossing, mean of time-loop tracking correction, and/or channel tap power time-variance, may be utilized for Doppler spread measurement.

The time filter unit 308c may be operable to determine time filter parameters comprising time filter coefficients and time filter length based on inter-carrier interference measurement and the Doppler spread measurement via the interference measurement unit 308e and the Doppler spread measurement unit 308d, respectively. The time filter unit 308 may be operable to time filter the raw channel estimates using the determined time filter parameters, for example, through averaging the raw channel estimates across multiple OFDM symbols with proper weights and/or recursively time filtering the raw channel estimates. The resulting time filtered channel estimates at corresponding RS tones may be utilized for data demodulation.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for Doppler spread and delay spread matching with channel estimation by circular convolution in OFDM communication networks.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for suppressing noise in an estimate of a channel using one or more processors and/or circuits, the method comprising:
   receiving an orthogonal frequency division multiplexing (OFDM) signal comprising a plurality of reference signal (RS) tones and a plurality of data symbols;
   extracting said plurality of RS tones from said received OFDM signal to form an input vector;
   inverse Fourier transforming said input vector to form a time domain representation of said channel estimate;
   measuring at least one of inter-carrier interference and Doppler spread associated with said channel to determine time filter parameters; and
   time filtering said time domain representation of said channel estimate based on said time filter parameters to suppress noise.

2. The method according to claim 1, wherein measuring at least one of said inter-carrier interference and said Doppler spread associated with said channel to determine time filter parameters comprises:
   measuring said Doppler spread using said time domain representation of said channel estimate and one or more other estimates of said channel.

3. The method according to claim 1, wherein measuring at least one of said inter-carrier interference and said Doppler spread associated with said channel to determine time filter parameters comprises:
   measuring said inter-carrier interference in the frequency domain using said extracted plurality of RS tones.

4. The method according to claim 3, wherein measuring said inter-carrier interference in the frequency domain using said extracted plurality of RS tones comprises:
   determining a mean of differences between RS tones, in said extracted plurality of RS tones, that are received over adjacent subcarriers.

5. The method according to claim 2, wherein measuring said Doppler spread using said time domain representation of said channel estimate and said one or more other estimates of said channel comprises:
   using, at least one of level crossing, axis crossing, mean of time-loop tracking correction, and channel tap power time-variance.

6. The method according to claim 1, wherein time filtering said time domain representation of said channel estimate based on said time filter parameters to suppress noise comprises:
   averaging said time domain representation of said channel estimate with one or more other estimates of said channel using said determined time filter parameters.

7. The method according to claim 1, wherein time filtering said time domain representation of said channel estimate based on said time filter parameters to suppress noise comprises:
   recursively filtering said time domain representation of said channel estimate using said determined time filter parameters.

8. The method according to claim 1, further comprising:
   demodulating said received plurality of data symbols using said time filtered time domain representation of said channel estimate.

9. A system for suppressing noise in an estimate of a channel, the system comprising:
   a receiver configured to receive an orthogonal frequency division multiplexing (OFDM) signal comprising a plurality of reference signal (RS) tones and a plurality of data symbols;
   an inverse Fourier transform unit configured to inverse Fourier transform an input vector comprising said plurality of RS tones extracted from said received OFDM signal to form a time domain representation of said channel estimate;
   a measurement unit configured to measure at least one of inter-carrier interference and Doppler spread associated with said channel to determine time filter parameters; and a time filter unit configured to time filter said time domain representation of said channel estimate based on said time filter parameters to suppress noise.

10. The system according to claim 9, wherein said measurement unit is configured to measure said Doppler spread using said time domain representation of said channel estimate and one or more other estimates of said channel.

11. The system according to claim 9, wherein said measurement unit is configured to measure said inter-carrier interference in the frequency domain using said extracted plurality of RS tones.

12. The system according to claim 11, wherein said measurement unit is configured to measure said inter-carrier interference in the frequency domain by determining a mean of differences between RS tones, in said extracted plurality of RS tones, that are received over adjacent subcarriers.

13. The system according to claim 10, wherein said measurement unit is configured to measure said Doppler spread using at least one of level crossing, axis crossing, mean of time-loop tracking correction, and channel tap power time-variance.

14. The system according to claim 9, wherein said time filter is configured to average said time domain representation of said channel estimate with one or more other estimates of said channel using said deteiinined time filter parameters.

15. The system according to claim 9, wherein said time filter is configured to recursively filter said time domain representation of said channel estimate using said determined time filter parameters.

16. The system according to claim 9, further comprising:
a demodulator configured to demodulate said plurality of data symbols using said time filtered time domain representation of said channel estimate.

17. A system for suppressing noise in an estimate of a channel, the system comprising:
an inverse Fourier transform unit configured to inverse Fourier transform an input vector comprising a plurality of RS tones extracted from an orthogonal frequency division multiplexing (OFDM) signal to form a time domain representation of said channel estimate;
a measurement unit configured to measure at least one of inter-carrier interference and Doppler spread associated with said channel to determine time filter parameters; and
a time filter unit configured to time filter said time domain representation of said channel estimate based on said time filter parameters to suppress noise.

18. The system according to claim 17, wherein said measurement unit is configured to measure said Doppler spread using said time domain representation of said channel estimate and one or more other estimates of said channel.

19. The system according to claim 17, wherein said measurement unit is configured to measure said inter-carrier interference in the frequency domain using said extracted plurality of RS tones.

20. The system according to claim 19, wherein said measurement unit is configured to measure said inter-carrier interference in the frequency domain by determining a mean of differences between RS tones, in said extracted plurality of RS tones, that are received over adjacent subcarriers.

* * * * *

UNITED STATES PATENT AND TRADEMARK OFFICE
CERTIFICATE OF CORRECTION

| | |
|---|---|
| PATENT NO. | : 8,428,163 B2 |
| APPLICATION NO. | : 12/646869 |
| DATED | : April 23, 2013 |
| INVENTOR(S) | : Mark Kent |

It is certified that error appears in the above-identified patent and that said Letters Patent is hereby corrected as shown below:

In the Claims:

Column 14, Line 32, replace "using," with --using--.

Column 15, Line 26, replace "deteiinined" with --determined--.

Signed and Sealed this
Eleventh Day of June, 2013

Teresa Stanek Rea
*Acting Director of the United States Patent and Trademark Office*